Oct. 12, 1926.  
N. A. RHOMBERG  
1,602,838  
TUBE CLEANING AND CUTTING MACHINE  
Original Filed March 10, 1924    2 Sheets-Sheet 2

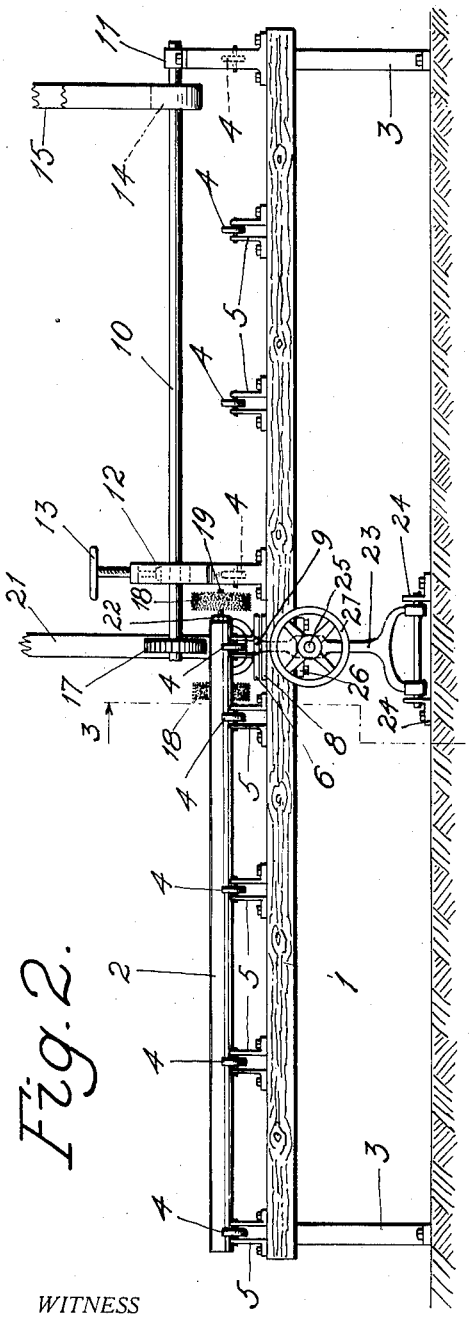

Patented Oct. 12, 1926.

1,602,838

UNITED STATES PATENT OFFICE.

NORBERT A. RHOMBERG, OF PORTLAND, OREGON.

TUBE CLEANING AND CUTTING MACHINE.

Application filed March 10, 1924, Serial No. 698,340. Renewed July 12, 1926.

My invention relates to improvements in tube cleaning and cutting machines, in which boiler tubing with calcareous incrustations on the outside travels with a rotary progressive motion past a rotating spur wheel, whereby the incrustations are broken, while suitably arranged rotary wire brushes help to remove the broken fragments of dust and dirt.

The same machine is utilized for cutting the tube by substituting a cutting wheel for the spur wheel.

The object of my invention is to produce a machine which cleans tubing effectively and rapidly so that the cleaned tube can be reinserted in the boiler while the second tube is cleaned in my machine.

Another object is to produce a machine which makes a crushing of the tube during the cleaning process unlikely since the crushing pressure is exerted mainly by hand.

Another object is to produce a machine which effectively removes all fragments of incrustations after they are broken.

Another object is to produce a machine which can also be effectively used in cutting the tube.

Other objects and advantages are to be found in the construction and arrangements of parts as will be described in the specification, and particularly pointed out in the appended claims.

I attain these objects with the mechanism illustrated in the accompanying drawing, in which—

Fig. 1 is a plan view of the entire machine.

Fig. 2 is a front elevation of Fig. 1.

Similar numerals refer to similar parts throughout the several views.

The bench 1, which should be approximately twice as long as the boiler tube 2, may be constructed of wood or metal, and rests on suitable floor stands 3.

Figure 3:
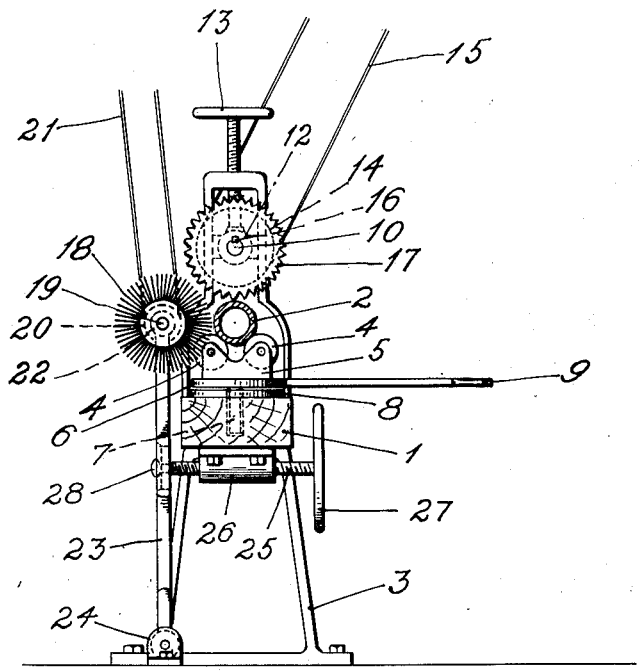
Fig. 3 is a section through Fig. 2 along the line 3—3.

Distributed over the bench 1 are a number of supports or saddles for the tube. To eliminate friction as much as possible each saddle is composed of two roller wheels 4 supported in bearings 5, which latter are rigidly affixed to the bench 1, with the exception of the center saddle. This latter is mounted on a turntable 6 which is pivoted in the bench 1 as shown at 7 in Fig. 3, and rotates on a suitable circular track 8. Rotation of the turntable is effected manually by means of the handle 9. Above the bench 1, and parallel thereto, is a shaft 10 supported in suitable bearings 11 and 12. In the latter the shaft 10 should be capable of adjustment for height by means of the hand wheel 13. The shaft 10 is driven by the pulley 14 and belt 15. Attached to the end of the shaft 10, either by the key 16 or any other desired means is a spur wheel 17, which is located directly over the turntable 6.

At the rear of the bench 1 are two rotary wire brushes 18, one on each side of the spur wheel 17.

These brushes are mounted on a shaft 19 and driven by a pulley 20 and belt 21. The shaft 19 is supported in bearings 22, which latter are attached to the top of the stand 23. The bottom of the stand 23 is preferably bifurcated for the sake of greater rigidity, and pivotally supported in bearings 24 on the floor. Attached to the under side of the bench 1 is a screw 25 mounted in a bracket 26 with female threads, and rotated by a hand wheel 27. The end 28 of the screw 25 is connected to the stand 23 in such a manner that a turning of the screw will change the distance between the rotary wire brushes 18 and the tube 2.

In operation the incrusted tube 2 is placed in the saddles with one end under the spur wheel 17. The spur wheel is then adjusted by means of the hand wheel 13 according to the diameter of the tube 2 but with a slight clearance between spur wheel 17 and tube 2. Spur wheel 17 and brushes 18 are now set in rotation and, by shifting the handle 9 on the turntable 6 right or left, according to the direction in which the tube 2 is intended to travel, the tube 2 will be forced to occupy a higher position in the center saddle whereby the incrustations on the tube 2 are brought into crushing contact with the teeth on the spur wheel 17. Since the spur wheel 17 rotates, the tube 2 is also thereby forced to rotate, and the oblique position assumed by the roller wheels 4 of the center saddle imparts to the tube 2 a rotary progressive motion similar to the motion described by an ordinary screw. Where the incrustations are slight the tube can be sent through with great rapidity by shifting the handle 9 on the turntable 6 further to one side accompanied by a proper adjustment of the spur wheel 17 for height. Thus every tube can be treated with the greatest possible effectiveness, and a great saving in time can be obtained. After the tube to its full length has passed the spur wheel 17 the handle 9 is reversed and the tube is sent back to its original position. The brushes 18 can be depended upon to remove the remaining fragments of dirt and dust in a very thorough manner so that, after passing this machine, the tube is in most instances ready to be reinserted in the boiler.

Figure 4:
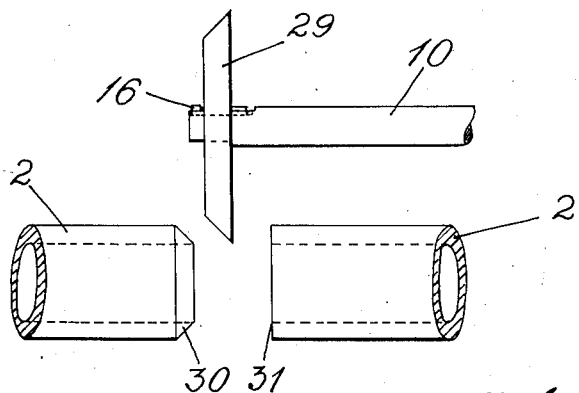
Fig. 4 is a detail of the pipe cutter.

In cutting a tube 2 a beveled cutter 29, Fig. 4, is substituted for the spur wheel 17. The handle 9 is left undisturbed in its central position and cutting pressure is supplied solely by turning the hand wheel 13. A scarfed cut 30 is left on the end of the tube if the latter is to be welded, otherwise the edge is cut vertically, as shown at 31.

Having thus described my invention, it will be seen that my objects have been accomplished and, though I have shown the preferred form of construction, I reserve to myself the right to make minor changes, providing I do not violate the spirit and principle of my invention.

I claim:

In a machine for operating on tubes, the combination of a bench, a rotating saddle mounted at the center of the bench, stationary saddles on opposite sides of the center saddle and in alinement therewith, said saddles being adapted to support a tube disposed in the stationary saddles and extending across the center saddle, a rotating spur wheel slidably mounted above the center saddle, the plane of said spur wheel traversing the line of alinement of said saddles at right angles, a partial rotation of said center saddle elevating said tube into contact with the spur wheel and imparting a rotary progressive motion to said tube, said motion varying with the degree of rotation of said center saddle, a pivotally mounted stand adjacent to the bench, two rotary brushes mounted on top of the stand in the space between the saddles and the spur wheel, one of said brushes being disposed on each side of the spur wheel, the plane of said brushes traversing the line of alinement of the saddles at right angles, a screw screwably mounted at the underside of the bench, said screw coacting with the stand to vary the distance between line of alinement of the saddles and brushes.

Signed by me at Portland, Oregon, this 5th day of March, 1924.

N. A. RHOMBERG.